United States Patent
Xin et al.

(10) Patent No.: US 10,869,106 B2
(45) Date of Patent: Dec. 15, 2020

(54) DATA TRANSMISSION METHOD AND APPARATUS, AND ELECTRONIC DEVICE

(71) Applicant: HANGZHOU HIKVISION DIGITAL TECHNOLOGY CO., LTD., Zhejiang (CN)

(72) Inventors: Anmin Xin, Zhejiang (CN); Yiwei Chen, Zhejiang (CN)

(73) Assignee: Hangzhou Hikvision Digital Technology Co., Ltd.

( * ) Notice: Subject to any disclaimer, the term of this patent is extended or adjusted under 35 U.S.C. 154(b) by 28 days.

(21) Appl. No.: 16/335,770

(22) PCT Filed: Aug. 23, 2017

(86) PCT No.: PCT/CN2017/098632
§ 371 (c)(1),
(2) Date: Mar. 22, 2019

(87) PCT Pub. No.: WO2018/054193
PCT Pub. Date: Mar. 29, 2018

(65) Prior Publication Data
US 2019/0246184 A1    Aug. 8, 2019

(30) Foreign Application Priority Data

Sep. 23, 2016 (CN) .......................... 2016 1 0846489

(51) Int. Cl.
*H04N 21/845* (2011.01)
*H04L 29/06* (2006.01)
(Continued)

(52) U.S. Cl.
CPC ......... *H04N 21/8456* (2013.01); *H04L 29/06* (2013.01); *H04L 65/607* (2013.01);
(Continued)

(58) Field of Classification Search
CPC ............ H04N 21/8456; H04N 21/6437; H04L 29/06; H04L 65/607; H04L 65/608; H04L 69/22; H04W 28/06
See application file for complete search history.

(56) References Cited

U.S. PATENT DOCUMENTS

2007/0002860 A1   1/2007  Cooper et al.
2016/0173556 A1*  6/2016  Park ................. H04N 21/85406
                                                                709/219

FOREIGN PATENT DOCUMENTS

CN      101141408       3/2008
CN      101646074       2/2010
(Continued)

OTHER PUBLICATIONS

Network Working Group, Request for Comments: 3550, Jul. 2003 (Year: 2003).*

*Primary Examiner* — Wing F Chan
*Assistant Examiner* — Billy H Ng
(74) *Attorney, Agent, or Firm* — Mark E. Brady; Rankin, Hill & Clark LLP (57) ABSTRACT

Embodiments of the present application disclose a method, an apparatus and an electronic device for transmitting data, which relate to technologies of data transmission and storage and can reduce network resource overhead and framing delay. The method for transmitting data includes: dividing a data frame to be transmitted into one or more payload packets having a predetermined length; adding a real-time transport protocol header for each payload packet, and marking a padding bit in the real-time transport protocol header as padded; in the padding field corresponding to the padding bit, marking a data type bit, a frame start bit, a frame end bit and a payload packet type bit for the payload packet to obtain an encapsulated real-time transport protocol packet, and transmitting the encapsulated real-time transport
(Continued)

- 101: dividing a data frame to be transmitted into one or more payload packets having a predetermined length
- 102: adding a real-time transport protocol header for each payload packet, and marking a padding bit in the real-time transport protocol header as padded
- 103: in the padding field corresponding to the padding bit, marking a data type bit, a frame start bit, a frame end bit and a payload packet type bit for the payload packet to obtain an encapsulated real-time transport protocol packet
- 104: transmitting the encapsulated real-time transport protocol packet protocol packet. The present application is applicable to the transmission of the RTP encapsulated data.

14 Claims, 3 Drawing Sheets

(51) Int. Cl.
*H04W 28/06* (2009.01)
*H04N 21/6437* (2011.01)

(52) U.S. Cl.
CPC ............ *H04L 65/608* (2013.01); *H04L 69/22* (2013.01); *H04N 21/6437* (2013.01); *H04W 28/06* (2013.01)

(56) References Cited

FOREIGN PATENT DOCUMENTS

| | | | | |
|---|---|---|---|---|
| CN | 104320416 | | 1/2015 | |
| CN | 104320416 A | * | 1/2015 | ........... H04L 65/608 |
| CN | 104394117 | | 3/2015 | |
| CN | 105577649 | | 5/2016 | |

* cited by examiner

```
 +-+-+-+-+-+-+-+-+-+-+-+-+-+-+-+-+-+-+-+-+-+-+-+-+-+-+-+-+-+-+-+-+
 0                   1                   2                   3
 0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |V=2|P|X|  CC   |M|     PT      |       sequence number        |
 +-+-+-+-+-+-+-+-+-+-+-+-+-+-+-+-+-+-+-+-+-+-+-+-+-+-+-+-+-+-+-+-+
 |                           timestamp                           |
 +-+-+-+-+-+-+-+-+-+-+-+-+-+-+-+-+-+-+-+-+-+-+-+-+-+-+-+-+-+-+-+-+
 |           synchronization source (SSRC) identifier            |
 +=+=+=+=+=+=+=+=+=+=+=+=+=+=+=+=+=+=+=+=+=+=+=+=+=+=+=+=+=+=+=+=+
 |            contributing source (CSRC) identifiers             |
 |                             ....                              |
 +-+-+-+-+-+-+-+-+-+-+-+-+-+-+-+-+-+-+-+-+-+-+-+-+-+-+-+-+-+-+-+-+
```

DATA TRANSMISSION METHOD AND APPARATUS, AND ELECTRONIC DEVICE

The present application claims the priority to a Chinese Patent Application No. 201610846489.3, filed with the China National Intellectual Property Administration on Sep. 23, 2016 and entitled "Data Transmission Method and Apparatus, and Electronic Device", which is incorporated into the present application by reference in its entirety.

TECHNICAL FIELD

The present application relates to technologies of data transmission and storage, and in particular to a method, an apparatus and an electronic device for transmitting data.

BACKGROUND

With the continuous development of computer communication and Internet technology, especially 4G communication technology, electronic devices, such as a smart mobile phone, a personal digital assistant, a palmtop, a notebook computer, etc., are becoming more and more widely used. More and more applications (APP) are installed in the electronic devices, and the more and more abundant application functions are also provided. For example, with the development of streaming media technology, synchronous playing of multi-channel audio and video data can be implemented through a player installed in an electronic device, thereby greatly enhancing and enriching user experience.

At present, in the synchronous transmission of multi-channel audio and video data, it is necessary to separately process multi-channel audio and video data. The acquisition, encoding, network transmission, decoding and output of audio and video data for each channel are independent of each other and are separately controlled. It is only required to synchronous play them during the play phase upon the output, i.e., the audio and video data of the multi-channel outputs are combined to output the multi-channel images on one display.

However, in this method for transmitting data, one channel of audio and video data needs to independently occupy one network transmission channel. When transmitting a large amount of audio and video data, the network resource overhead is large. Moreover, at a receiving end, the framing and stitching need to be performed based on timestamp information in each channel of audio and video data, and thus the delay is large.

SUMMARY

In view of this, embodiments of the present application provide a method, an apparatus and an electronic device for transmitting data, which can reduce network resource overhead and framing delay.

In a first aspect, an embodiment of the present application provides a method for transmitting data, including:

dividing a data frame to be transmitted into one or more payload packets having a predetermined length;

adding a real-time transport protocol header for each payload packet, and marking a padding bit in the real-time transport protocol header as padded;

in a padding field corresponding to the padding bit, marking a data type bit, a frame start bit, a frame end bit and a payload packet type bit for the payload packet to obtain an encapsulated real-time transport protocol packet;

transmitting the encapsulated real-time transport protocol packet.

Combining with the first aspect, in a first implementation of the first aspect, the padding field corresponding to the padding bit includes a data padding field and an extension field; wherein, the extension field occupies 4 bytes, and includes a reserved field, a multiple frame indicator field and a padding size field.

Combining with the first implementation of the first aspect, in a second implementation of the first aspect, in the multiple frame indicator field, the data type bit occupies 2 bits, each of the frame start bit and the frame end bit occupies 1 bit, and the payload packet type bit occupies 2 bits.

Combining with the second implementation of the first aspect, in a third implementation of the first aspect, the multiple frame indicator field further includes a payload packet sequence number bit and a channel bit each of which occupies 4 bits.

Combining with the first aspect, any one of the first to third implementations of the first aspect, in a fourth implementation of the first aspect, the obtaining of an encapsulated real-time transport protocol packet includes:

if the payload packet is the first payload packet but not the last payload packet of the data frame, in the padding field corresponding to the padding bit, marking the frame start bit as valid, and marking the frame end bit as invalid;

if the payload packet is the first payload packet and the last payload packet of the data frame, in the padding field corresponding to the padding bit, marking the frame start bit as valid, and marking the frame end bit as valid;

if the payload packet is the last payload packet but not the first payload packet of the data frame, in the padding field corresponding to the padding bit, marking the frame start bit as invalid, and marking the frame end bit as valid;

if the payload packet is neither the first payload packet nor the last payload packet of the data frame, in the padding field corresponding to the padding bit, marking the frame start bit as invalid, and marking the frame end bit as invalid;

encapsulating the marked payload packet to obtain an encapsulated real-time transport protocol packet.

Combining with the fourth implementation of the first aspect, in a fifth implementation of the first aspect, before encapsulating the marked payload packet, the method further includes:

if the payload packet is a video frame I, in the padding field corresponding to the padding bit, marking the data type bit as 00, marking the payload packet type bit as 00, and marking a payload packet sequence number bit based on a sequence number of the payload packet during the dividing of the data frame;

if the payload packet is a video frame P, in the padding field corresponding to the padding bit, marking the data type bit as 00, marking the payload packet type bit as 01, and marking the payload packet sequence number bit based on a sequence number of the payload packet during the dividing of the data frame;

if the payload packet is a video frame B, in the padding field corresponding to the padding bit, marking the data type bit as 00, marking the payload packet type bit as 10, and marking the payload packet sequence number bit based on a sequence number of the payload packet during the dividing of the data frame;

if the payload packet is an audio, in the padding field corresponding to the padding bit, marking the data type bit as 01, marking the payload packet type bit as 01, and marking the payload packet sequence number bit based on a sequence number of the payload packet during the dividing of the data frame;

if the payload packet is private data, in the padding field corresponding to the padding bit, marking the data type bit as 10, marking the payload packet type bit as 11, and marking the payload packet sequence number bit based on a sequence number of the payload packet during the dividing of the data frame.

Combining with the first aspect, any one of the first to third implementations of the first aspect, in a sixth implementation of the first aspect, the method further includes:

receiving the encapsulated real-time transport protocol packet;

parsing a real-time transport protocol header of the received encapsulated real-time transport protocol packet;

if the padding bit in the real-time transport protocol header is marked as padded, reading each of the marked bits in the padding field corresponding to the padding bit, and obtaining a payload packet in the encapsulated real-time transport protocol packet through parsing based on the read marked bits.

Combining with the sixth implementation of the first aspect, in a seventh implementation of the first aspect, obtaining a payload packet in the encapsulated real-time transport protocol packet through parsing based on the read marked bits, includes:

reading the marked data type bit in the padding field corresponding to the padding bit; if the data type bit is marked as 01 or 10, reading the frame start bit and the frame end bit in the padding field corresponding to the padding bit; if the frame start bit is marked as valid and the frame end bit is marked as valid, determining that the transmitted data frame only includes a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame;

if the read data type bit in the padding field corresponding to the padding bit is marked as 00, reading the payload packet type bit in the padding field corresponding to the padding bit to determine that the payload packet behind the currently parsed real-time transport protocol header is a video frame I, a video frame P or a video frame B, and reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame.

Combining with the sixth implementation of the first aspect, in an eighth implementation of the first aspect, the method further includes:

adding a packetized elementary stream fixed header for the payload packet currently obtained through parsing, and marking a padding bit in the packetized elementary stream fixed header as padded; in the padding field corresponding to the padding bit, marking the data type bit, the frame start bit, the frame end bit and the payload packet type bit for the payload packet to obtain a packetized elementary stream packet;

storing the packetized elementary stream packet.

Combining with the eighth implementation of the first aspect, in a ninth implementation of the first aspect, the length of the padding field corresponding to the padding bit is no more than 7 bytes and no less than 4 bytes, and the padding field includes a padding byte and an extension field; wherein, the extension field is located between the packetized elementary stream fixed header and the padding byte.

In a second aspect, an embodiment of the present application provides an apparatus for transmitting data, including: a dividing module, a real-time transport protocol header marking module, a padding field marking module and a transmission module; wherein, the dividing module is configured for dividing a data frame to be transmitted into one or more payload packets having a predetermined length;

the real-time transport protocol header marking module is configured for adding a real-time transport protocol header for each payload packet, and marking a padding bit in the real-time transport protocol header as padded;

the padding field marking module is configured for, in a padding field corresponding to the padding bit, marking a data type bit, a frame start bit, a frame end bit and a payload packet type bit for the payload packet to obtain an encapsulated real-time transport protocol packet;

the transmission module is configured for transmitting the encapsulated real-time transport protocol packet.

Combining with the second aspect, in a first implementation of the second aspect, the padding field corresponding to the padding bit includes a data padding field and an extension field; wherein, the extension field occupies 4 bytes, and includes a reserved field, a multiple frame indicator field and a padding size field.

Combining with the first implementation of the second aspect, in a second implementation of the second aspect, in the multiple frame indicator field, the data type bit occupies 2 bits, each of the frame start bit and the frame end bit occupies 1 bit, and the payload packet type bit occupies 2 bits.

Combining with the second implementation of the second aspect, in a third implementation of the second aspect, the multiple frame indicator field further includes a payload packet sequence number bit and a channel bit each of which occupies 4 bits.

Combining with the second aspect, any one of the first to third implementations of the first aspect, in a fourth implementation of the second aspect, the padding field marking module includes a padding field marking unit and an encapsulation unit; wherein, the padding field marking unit is configured for, if the payload packet is the first payload packet but not the last payload packet of the data frame, in the padding field corresponding to the padding bit, marking the frame start bit as valid, and marking the frame end bit as invalid;

if the payload packet is the first payload packet and the last payload packet of the data frame, in the padding field corresponding to the padding bit, marking the frame start bit as valid, and marking the frame end bit as valid;

if the payload packet is the last payload packet but not the first payload packet of the data frame, in the padding field corresponding to the padding bit, marking the frame start bit as invalid, and marking the frame end bit as valid;

if the payload packet is neither the first payload packet nor the last payload packet of the data frame, in the padding field corresponding to the padding bit, marking the frame start bit as invalid, and marking the frame end bit as invalid;

the encapsulation unit is configured for encapsulating the marked payload packet to obtain an encapsulated real-time transport protocol packet.

Combining with the fourth implementation of the second aspect, in a fifth implementation of the second aspect, the padding field marking module further includes:

a payload packet type bit marking unit, configured for, if the payload packet is a video frame I, in the padding field corresponding to the padding bit, marking the data type bit as 00, marking the payload packet type bit as 00, and marking a payload packet sequence number bit based on a sequence number of the payload packet during the dividing of the data frame;

if the payload packet is a video frame P, in the padding field corresponding to the padding bit, marking the data type bit as 00, marking the payload packet type bit as 01, and marking the payload packet sequence number bit based on a sequence number of the payload packet during the dividing of the data frame;

if the payload packet is a video frame B, in the padding field corresponding to the padding bit, marking the data type bit as 00, marking the payload packet type bit as 10, and marking the payload packet sequence number bit based on a sequence number of the payload packet during the dividing of the data frame;

if the payload packet is an audio, in the padding field corresponding to the padding bit, marking the data type bit as 01, marking the payload packet type bit as 01, and marking the payload packet sequence number bit based on a sequence number of the payload packet during the dividing of the data frame;

if the payload packet is private data, in the padding field corresponding to the padding bit, marking the data type bit as 10, marking the payload packet type bit as 11, and marking the payload packet sequence number bit based on a sequence number of the payload packet during the dividing of the data frame;

outputting the marked payload packet to the encapsulation unit.

Combining with the second aspect, any one of the first to third implementations of the first aspect, in a sixth implementation of the second aspect, the apparatus further includes a receiving module, an parsing module and a payload packet obtaining module; wherein, the receiving module is configured for receiving the encapsulated real-time transport protocol packet;

the parsing module is configured for parsing a real-time transport protocol header of the received encapsulated real-time transport protocol packet;

the payload packet obtaining module is configured for, if the padding bit in the real-time transport protocol header is marked as padded, reading each of the marked bits in the padding field corresponding to the padding bit, and obtaining a payload packet in the encapsulated real-time transport protocol packet through parsing based on the read marked bits.

Combining with the sixth implementation of the second aspect, in a seventh implementation of the second aspect, obtaining a payload packet in the encapsulated real-time transport protocol packet through parsing based on the read marked bits, includes:

reading the marked data type bit in the padding field corresponding to the padding bit; if the data type bit is marked as 01 or 10, reading the frame start bit and the frame end bit in the padding field corresponding to the padding bit; if the frame start bit is marked as valid and the frame end bit is marked as valid, determining that the transmitted data frame only includes a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame;

if the read data type bit in the padding field corresponding to the padding bit is marked as 00, reading the payload packet type bit in the padding field corresponding to the padding bit to determine that the payload packet behind the currently parsed real-time transport protocol header is a video frame I, a video frame P or a video frame B, and reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame.

Combining with the sixth implementation of the second aspect, in an eighth implementation of the second aspect, the apparatus further includes a packetized elementary stream encapsulation module and a storage module; wherein, the packetized elementary stream encapsulation module is configured for adding a packetized elementary stream fixed header for the payload packet currently obtained through parsing, and marking a padding bit in the packetized elementary stream fixed header as padded; in the padding field corresponding to the padding bit, marking the data type bit, the frame start bit, the frame end bit and the payload packet type bit for the payload packet to obtain a packetized elementary stream packet;

the storage module is configured for storing the packetized elementary stream packet.

Combining with the eighth implementation of the second aspect, in a ninth implementation of the second aspect, the length of the padding field corresponding to the padding bit is no more than 7 bytes and no less than 4 bytes, and the padding field includes a padding byte and an extension field; wherein, the extension field is located between the packetized elementary stream fixed header and the padding byte.

In a third aspect, an embodiment of the present application provides an electronic device. The electronic device includes a housing, a processor, a memory, a circuit board and a power circuit; wherein the circuit board is arranged inside a space surrounded by the housing; the processor and the memory are arranged on the circuit board; the power circuit is configured for supplying power to each of circuits or components of the electronic device; the memory is configured for storing an executable program code; the processor is configured for implementing any method for transmitting data described above by reading the executable program code stored in the memory to execute a program corresponding to the executable program code.

In a fourth aspect, an embodiment of the present application provides a storage medium which is configured for storing an executable program code, and the executable program code is configured for, when being executed, implementing any method for transmitting data described above.

Embodiments of the present application provide a method, an apparatus and an electronic device for transmitting data. By dividing a data frame to be transmitted into one or more payload packets having a predetermined length; adding a real-time transport protocol header for each payload packet, and marking a padding bit in the real-time transport protocol header as padded; in the padding field corresponding to the padding bit, marking a data type bit, a frame start bit, a frame end bit and a payload packet type bit for the payload packet to obtain an encapsulated real-time transport protocol packet; and transmitting the encapsulated real-time transport protocol packet, the network resource overhead and framing delay can be reduced.

BRIEF DESCRIPTION OF THE DRAWINGS

To describe the technical solutions of embodiments of the present application or the prior art more clearly, the accompanying drawings to be used in the description of embodiments or the prior art will are described briefly below. Evidently, the accompanying drawings described below are merely for some embodiments of the present application. Those with ordinary skills in the art can obtain other drawings based on these accompanying drawings without creative efforts.

DETAILED DESCRIPTION

The embodiments of the present application will be described in detail below with reference to the accompanying drawings.

It should be clear that the embodiments described are merely a part rather than all of the embodiments of the present application. All other embodiments obtained by those skilled in the art based on the embodiments of the present application without any creative efforts fall into the protection scope of the present application.

Figure 1:
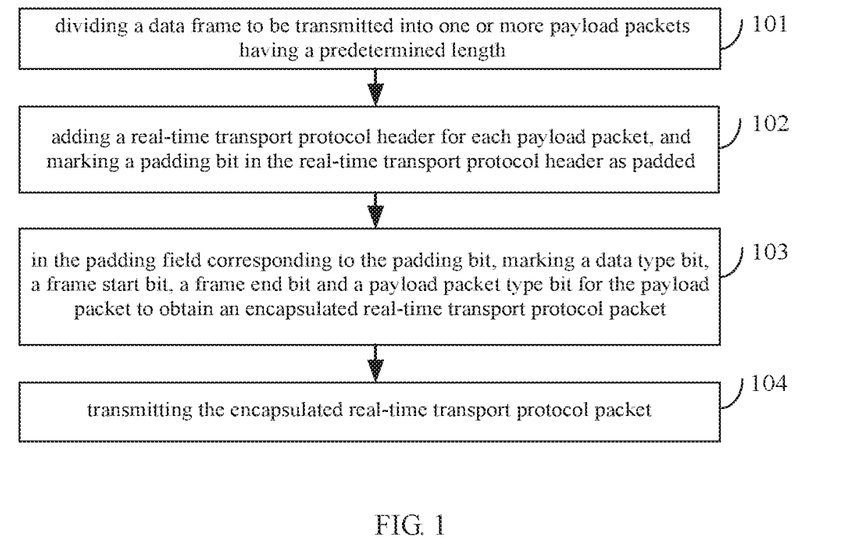
FIG. 1 is a schematic flowchart of a method for transmitting data of the first embodiment of the present application.

FIG. 1 is a schematic flowchart of a method for transmitting data of the first embodiment of the present application, as shown in FIG. 1, the method in this embodiment may include:

Step 101: dividing a data frame to be transmitted into one or more payload packets having a predetermined length.

In this embodiment, as an optional embodiment, the predetermined length is 4 bytes. The length of the last payload packet is less than or equal to 4 bytes.

Step 102: adding a real-time transport protocol header for each payload packet, and marking a padding bit in the real-time transport protocol header as padded.

In this embodiment, the Real-Time Transport Protocol (RTP) is a standard packet protocol for transmitting data over the Internet.

In this embodiment, by adding a real-time transport protocol header for each of payload packets and encapsulating the payload packet through the Real-Time Transport Protocol, the payload packet becomes an encapsulated real-time transport protocol packet, which may enhance the real-time performance of data transmission. Wherein, multiple real-time transport protocol packets form a frame RTP packet.

Figure 2:
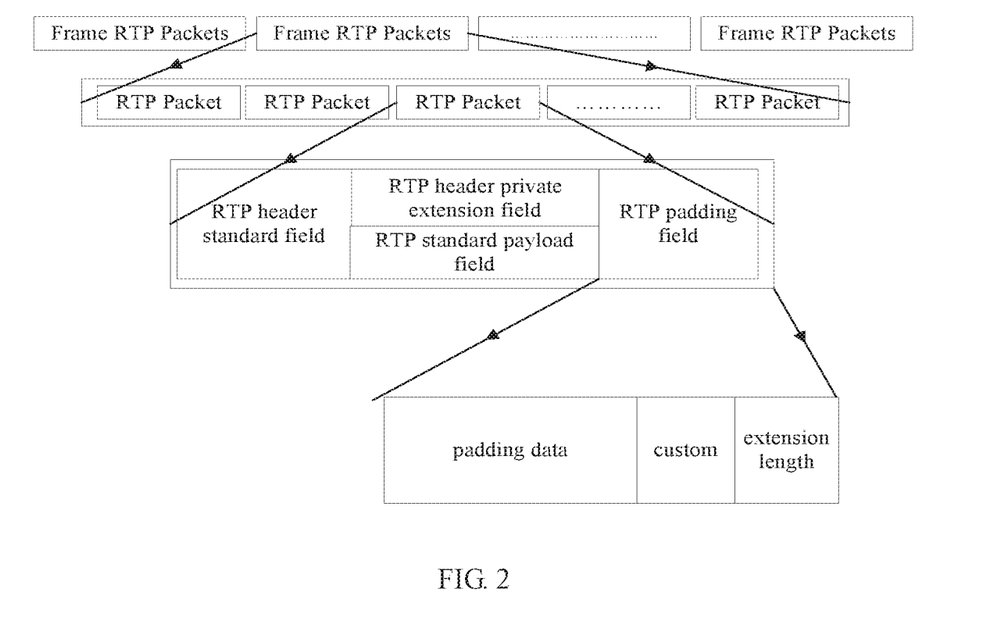
FIG. 2 is a schematic structural diagram of a frame RTP packet.

FIG. 2 is a schematic structural diagram of a Frame RTP packet. Referring to FIG. 2, a frame RTP packet includes one or more RTP packets, each of which contains an RTP header standard field (RTP header), an RTP header private extension field, an RTP standard payload field and an RTP padding field. Wherein, the RTP padding field includes a padding data field, a custom field and an extension length field.

Figure 3:
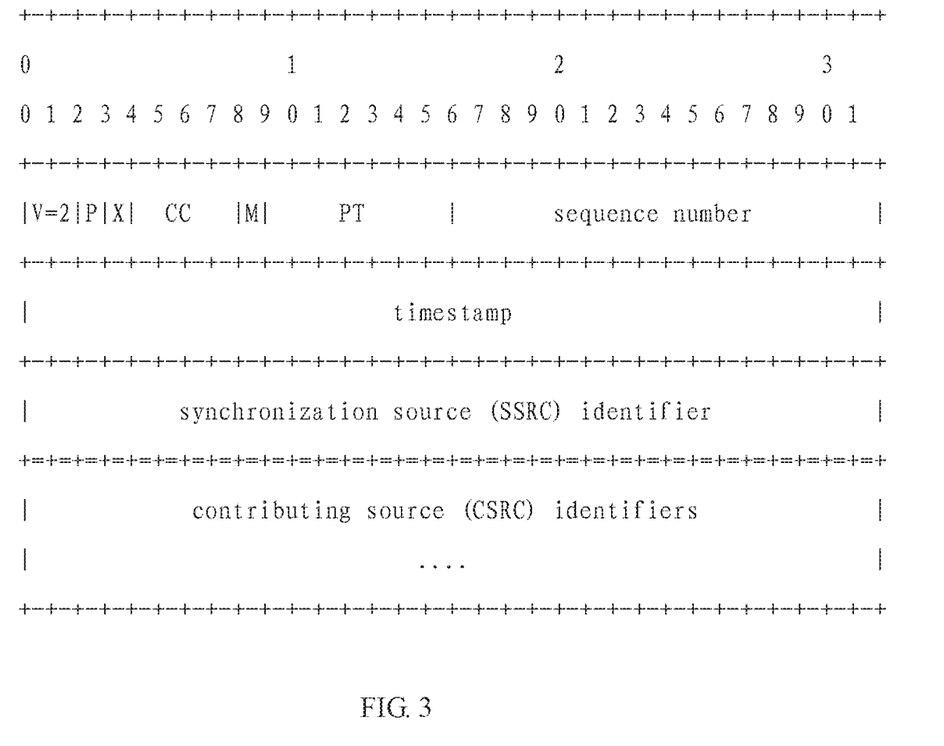
FIG. 3 is a schematic structural diagram of an RTP header of this embodiment.

FIG. 3 is a schematic structural diagram of an RTP header of this embodiment. Referring to FIG. 3, the "−" or "=" between two "+" is represented as a small interval, and each small interval represents 1 bit. Wherein, according to the definition of RFC3550, each of syntax formats of the RTP header is described as follows:

version (V), which occupies 2 bits and identifies a version;

padding (P), which occupies 1 bit; it identifies whether there is a padding part, and when being set to 1, represents that there is a padding part at the end of the RTP packet; the last byte of this padding part represents the length of this padding part (including the length of the last byte itself);

extension (X), which occupies 1 bit; it is an extension bit, which identifies whether there is an extension field, and when being set to 1, represents that the RTP header of this RTP packet includes an extension field;

CSRC count (CC), which occupies 4 bits and identifies the number of Contributing Source (CSRC) fields;

marker (M), which occupies 1 bit, and when being set to 1, represents that the current RTP packet is the last packet transmitted;

payload type (PT), which occupies 7 bits and is configured for identifying the type of the transmitted data;

sequence number (SN), which occupies 16 bits and is configured for identifying the order in which RTP packets are sent, i.e., the order in which they are sent to a decoder by a receiving end after reception; wherein, for each RTP packet, the number is incremented by 1;

timestamp, which occupies 32 bits and is configured for identifying the acquisition (sampling) time of the content contained in this RTP packet;

other fields, such as a synchronization source (SSRC) identifier, a CSRC identifier, etc., whose specific syntax formats are described in the related protocol and are omitted here.

Step 103: in the padding field corresponding to the padding bit, marking a data type bit, a frame start bit, a frame end bit and a payload packet type bit for the payload packet to obtain an encapsulated real-time transport protocol packet.

In this embodiment, RTP encapsulation for the payload packet is performed in a 4-byte aligned manner. In practical applications, it is needed to perform a padding operation on the RTP standard payload field since not all the RTP actual payload packets are strictly 4-byte aligned. The number of padding bytes is 1, 2 or 3, and the last padding byte represents the padding length.

Figure 4:
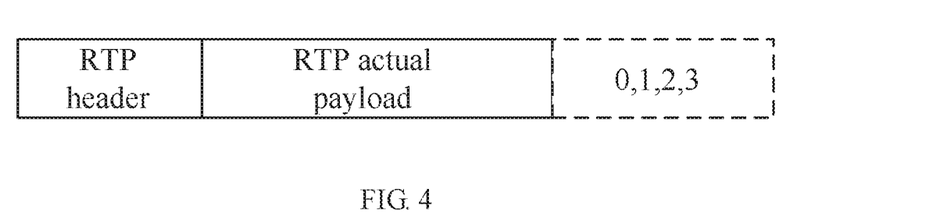
FIG. 4 is a schematic structural diagram of an encapsulated RTP packet in the prior art

FIG. 4 is a schematic structural diagram of an encapsulated RTP packet in the related art, as shown in FIG. 4. 0, 1, 2, and 3 in the figure are padding bytes, i.e., padding fields for padding bits. For example, if the length of the payload packet is 4 bytes, the padding byte is 0, and the dashed box in the figure is empty, which represents that there is no padding; if the length of the payload packet is 3 bytes, the padding byte is 1, and the byte of the dashed box is 0xff 0x01; if the length of the payload packet is 2 bytes, the padding byte is 2, and the byte of the dashed box is 0xff 0x02, and so on.

Figure 5:
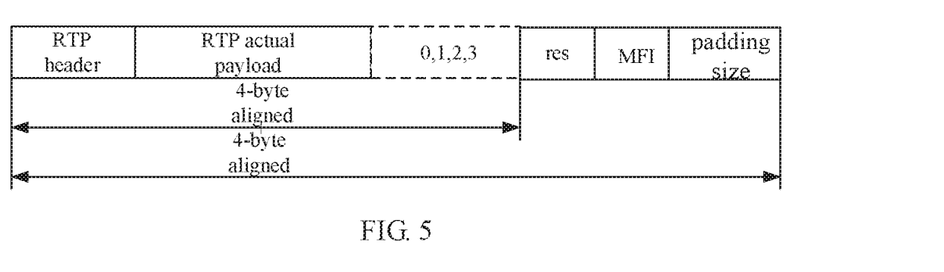
FIG. 5 is a schematic structural diagram of an encapsulated RTP packet in this embodiment.

In this embodiment, the padding field corresponding to the padding bit is improved, and the default use of the padding field in the RTP header is extended. FIG. 5 shows a schematic structural diagram of the encapsulated RTP packet in this embodiment. At least 4 bytes are padded in the padding field. Compared with the structure of the encapsulated RTP packet of FIG. 4, the padding field is extended by 4 bytes.

In this embodiment, as an optional embodiment, the padding field corresponding to the padding bit includes a data padding field and an extension field. Wherein, the extension field occupies 4 bytes, and successively includes a reserved field (res), a multiple frame indicator field (MFI) and a padding size field.

The reserved field occupies 2 bytes and is filled with 0 by default.

The padding size field refers to the size of actual data except for the payload data, including one byte occupied by itself. For example, the padding bit includes 0, 1, 2, res, MFI and the padding size field in FIG. 5.

Figure 6:
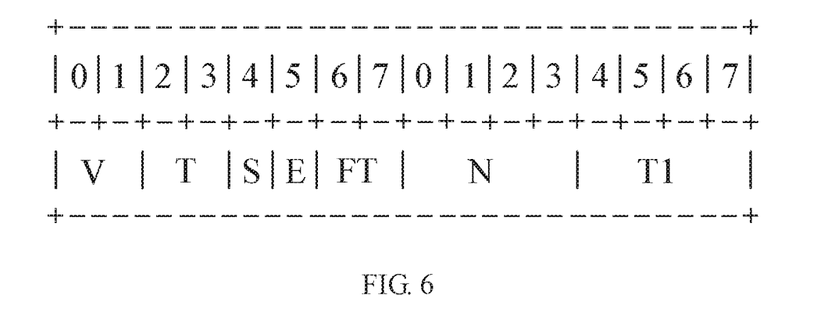
FIG. 6 is a schematic diagram of a syntax format of a multiple frame indicator field in this embodiment.

FIG. 6 is a schematic diagram of a syntax format of a multiple frame indicator field in this embodiment. Referring to FIG. 6, the multiple frame indicator field occupies 2 bytes, wherein "–" indicates 1 bit, and the syntax format is as follows:

V, which occupies 2 bits and identifies the type version number of MFI;

T, a data type bit, which occupies 2 bits and identifies the data type, wherein, 00 identifies a video, 01 identifies an audio, 10 identifies a private frame, and 11 is used as a reserved bit;

S, a frame start bit, which occupies 1 bit and identifies the start of a multiple frame (data frame); wherein, if being set to 1 (valid), it identifies that the multiple frame (data frame) is an initial RTP packet which starts from frame $I_{mi}$ or $P_{mi}$; if being set to 0 (invalid), it identifies that the multiple frame is a RTP packet behind an initial RTP packet;

E, a frame end bit, which occupies 1 bit and identifies the end of a multiple frame; wherein, if being set to 1, it identifies that the multiple frame is a RTP packet which ends with frame $I_{mi}$ or $P_{mi}$; if being set to 0, it identifies that the transmission of other multiple frames completes;

FT, a payload packet type bit, which occupies 2 bits and identifies the type of a payload packet; wherein, if T is 00 (video), i.e., the data frame to be transmitted is a video, 00 is set to identify frame I, 01 to identify frame P, 10 to identify frame B, and 11 as a reservation;

if T is 01 (audio), 01 is used for identification and the others for reservation;

if T is 10 (private frame), 11 is used for identification and others for reservation;

N, a payload packet sequence number bit, which occupies 4 bits and identifies the sequence number, ranging from 0 to 15, of a channel to which the transmitted payload packet (the encapsulated real-time transport protocol packet) belongs.

In an optional embodiment of the present application, the above-mentioned sequence number of a channel to which a transmitted payload packet belongs, may be equivalent to the sequence number of the payload packet during the dividing of a data frame mentioned below.

T1, a channel bit, which occupies 4 bits and identifies the number of a channel for a data frame to be transmitted.

The channel bit may identify the number of a channel for the data frame to be transmitted, i.e., may identify which channel the data frame to be transmitted specifically belongs to.

In this embodiment, by padding, in the data encapsulation process, with the sequence number N of this payload packet in the data frame and the number T1 of a channel for the data frame to be transmitted, the channel for the received data during the actual transmission process and the position of the data in the data frame are identified, such that it is possible to distinguish which channel the received data belongs to and the specific position of the received data by parsing this sequence number N and the number T1 at a receiving end.

In this embodiment, for example, if the data frame to be transmitted has third-channel video data, T1 is set to 3, and if it has sixth-channel video data, T1 is set to 6.

In this embodiment, in the subsequent data parsing process, whether the current frame $I_{mi}$ ends can be determined through N (the sequence number of the encapsulated real-time transport protocol packet), T1, S and E, and then the actual audio and video frames and the size thereof in a multiple frame can be recorded. Wherein, T1 refers to a channel to which the data specifically belongs, for example, if the RTP packet is the first-channel video data, the corresponding sequence number T1 may be set to 0; S is a data frame start mark, and if the S mark is read, it can be known that the data frame starts to be transmitted, so that (encapsulated) RTP packets can be continuously acquired. When the sequence number N of a read RTP packet is also 0 and the E mark is 1, it can be considered that the first-channel video data has been transmitted completely, and the first-channel video data transmitted completely can be extracted.

In this embodiment, in the subsequent data parsing process, whether the current frame $I_{mi}$, ends or not can be determined through N (the sequence number of the encapsulated real-time transport protocol packet), T1, S and E, and then the amount of the audio and video data and the size of each audio and video data actually included in a multiple frame can be recorded. Wherein, N refers to the number of a channel to which the data specifically belongs, for example, if the RTP packet is the first-channel video data, the corresponding sequence number N may be set to 0; S is a data frame start mark, and if the S mark is read, it can be known that the data frame starts to be transmitted, so that (encapsulated) RTP packets can be continuously acquired. When the sequence number N of a read RTP packet is also 0 and the E mark is 1, it can be considered that the first-channel video data has been transmitted completely, and the first-channel video data transmitted completely can be extracted.

In this embodiment, there is no data of mixed types in the multiple frame (data frame). For example, the frame I and the frame P do not exist at the same time, or, the video frame and the audio frame do not exist at the same time, or, the video frame and the private frame do not exist at the same time.

In this embodiment, by dividing one frame of data into multiple data units (payload packets), adding an RTP header for each data unit, performing a data unit information definition on a padding field in the RTP header, i.e., introducing, in the definition of RTP padding, the start and end marks of the data, the problem of delay during data parsing may be effectively reduced. At the same time, the multi-channel audio and video data is synthesized and transmitted in a network transmission channel, which effectively reduces the network resource overhead.

In this embodiment, as an optional embodiment, the obtaining of an encapsulated real-time transport protocol packet includes:

if the payload packet is the first payload packet but not the last payload packet of the data frame, in the padding field corresponding to the padding bit, marking the frame start bit as valid, and marking the frame end bit as invalid;

if the payload packet is the first payload packet and the last payload packet of the data frame, in the padding field corresponding to the padding bit, marking the frame start bit as valid, and marking the frame end bit as valid;

if the payload packet is the last payload packet but not the first payload packet of the data frame, in the padding field corresponding to the padding bit, marking the frame start bit as invalid, and marking the frame end bit as valid;

if the payload packet is neither the first payload packet nor the last payload packet of the data frame, in the padding field corresponding to the padding bit, marking the frame start bit as invalid, and marking the frame end bit as invalid;

encapsulating the marked payload packet to obtain an encapsulated real-time transport protocol packet.

In this embodiment, as an optional embodiment, before encapsulating the marked payload packet, the method further includes:

if the payload packet is a video frame I, in the padding field corresponding to the padding bit, marking a data type bit as 00, marking a payload packet type bit as 00, and marking the payload packet sequence number bit based on a sequence number of the payload packet during the dividing of the data frame;

if the payload packet is a video frame P, in the padding field corresponding to the padding bit, marking the data type bit as 00, marking the payload packet type bit as 01, and marking the payload packet sequence number bit based on a sequence number of the payload packet during the dividing of the data frame;

if the payload packet is a video frame B, in the padding field corresponding to the padding bit, marking the data type bit as 00, marking the payload packet type bit as 10, and marking the payload packet sequence number bit based on a sequence number of the payload packet during the dividing of the data frame;

if the payload packet is an audio, in the padding field corresponding to the padding bit, marking the data type bit as 01, marking the payload packet type bit as 01, and marking the payload packet sequence number bit based on a sequence number of the payload packet during the dividing of the data frame;

if the payload packet is private data, in the padding field corresponding to the padding bit, marking the data type bit as 10, marking the payload packet type bit as 11, and marking the payload packet sequence number bit based on a sequence number of the payload packet during the dividing of the data frame.

Step 104: transmitting the encapsulated real-time transport protocol packet.

As an optional embodiment, the method further includes:

receiving the encapsulated real-time transport protocol packet;

parsing a real-time transport protocol header of the encapsulated real-time transport protocol packet received;

if the padding bit in the real-time transport protocol header is marked as padded, reading each of the marked bits in the padding field corresponding to the padding bit, and obtaining a payload packet in the encapsulated real-time transport protocol packet through parsing based on the read marked bits.

In this embodiment, as an optional embodiment, obtaining a payload packet in the encapsulated real-time transport protocol packet through parsing based on the read marked bits, includes:

reading the data type bit in the padding field corresponding to the padding bit; if the data type bit is 01 or 10, reading the frame start bit and the frame end bit in the padding field corresponding to the padding bit; if the frame start bit is marked as valid and the frame end bit is marked as valid, determining that the transmitted data frame only includes a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame;

if the read data type bit in the padding field corresponding to the padding bit is marked as 00, reading the payload packet type bit in the padding field corresponding to the padding bit to determine that the payload packet behind the currently parsed real-time transport protocol header is a video frame I, a video frame P or a video frame B, and reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame.

In this embodiment, reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame, includes:

if the frame start bit is marked as valid and the frame end bit is marked as valid, determining that the transmitted data frame only includes a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine the position of the payload packet behind the currently parsed real-time transport protocol header in the transmitted data frame.

In this embodiment, after the position of the payload packet behind the currently parsed real-time transport protocol header in the transmitted data frame is determined, framing may be performed based on the position of each payload packet in the transmitted data frame to obtain the data frame.

In this embodiment, since transmission of encapsulated RTP packets is a network data transmission mode, the transmitted RTP packet carries less information and thus is not suitable for storage. Thus, as an optional embodiment, the method may further include:

adding a packetized elementary stream fixed header for the payload packet currently obtained through parsing, and marking a padding bit in the packetized elementary stream fixed header as padded; in the padding field corresponding to the padding bit, marking the data type bit, the frame start bit, the frame end bit and the payload packet type bit for the payload packet to obtain a packetized elementary stream packet;

storing the packetized elementary stream packet.

In this embodiment, the MPEG2PS/TS is an encapsulated container for multiplexing digital audio, video and so on, and the basic unit of the encapsulation format is a packetized elementary stream (PES) packet. In this embodiment, the format of the data storage is designed based on standard documents of RTP and MPEG2PS. Wherein, in order to improve data processing efficiency, MPEG2PS is processed in a 4-byte aligned manner by default.

In this embodiment, the payload packet obtained through parsing is encapsulated in the 4-byte aligned manner, i.e., the PES fixed header, the padding byte and the payload are 4-byte aligned as a whole, and there is no limitation on whether the actual payload data is 4-byte aligned.

Figure 7:
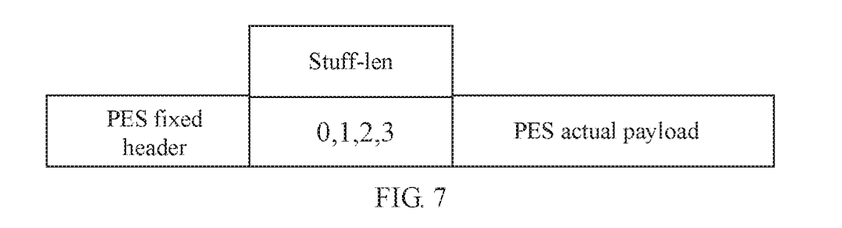
FIG. 7 is a schematic structural diagram of an encapsulated PES packet in the prior art.

FIG. 7 is a schematic structural diagram of an encapsulated PES packet in the prior art.

Figure 8:
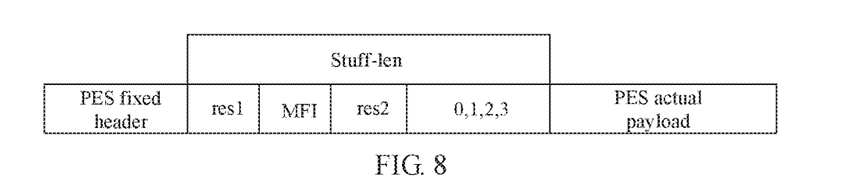
FIG. 8 is a schematic structural diagram of an encapsulated PES packet in this embodiment.

FIG. 8 is a schematic structural diagram of an encapsulated PES packet in this embodiment. Referring to FIG. 7 and FIG. 8, in the encapsulated PES packet in the prior art, since the encapsulated PES packet is 4-byte aligned, the length of the padding bit in the padding field corresponding to the padding bit may be 0, 1, 2, 3 bytes, i.e., the padding length (Stuff-len) is no more than 3 bytes and no less than 0 byte, and the padding byte is padded at the end of the data header (PES fixed header).

In the encapsulated PES packet in this embodiment, the padding field corresponding to the padding bit includes a padding byte and an extension field, wherein, the length of the padding bit may be 0, 1, 2, 3 bytes, which is no more than 3 bytes and no less than 0 byte;

the length of the extension field is 4 bytes.

Therefore, in this embodiment, the length of the padding field corresponding to the padding bit is 4, 5, 6, or 7 bytes, which is no more than 7 bytes and no less than 4 bytes.

In this embodiment, as an optional embodiment, the extension field is located between the PES fixed header and the padding byte, and successively includes a first reserved field, a multiple frame indicator field and a second reserved field. Wherein, the first reserved field (res1) and the second reserved field (res2) occupy 1 byte respectively;

the multiple frame indicator field (MFI) occupies two bytes, which is the same as MFI in the RTP packet. The syntax format is as follows:

V, which occupies 2 bits and identifies the type version number of MFI;

T, a data type bit, which occupies 2 bits and identifies the data type, wherein, 00 identifies a video, 01 identifies an audio, 10 identifies a private frame, and 11 is used as a reserved bit;

S, a frame start bit, which occupies 1 bit and identifies the start of a multiple frame (data frame); wherein, if being set to 1 (valid), it identifies that the multiple frame (data frame) is an initial RTP packet which starts from frame $I_{mi}$ or $P_{mi}$; if being set to 0 (invalid), it identifies that the multiple frame is a RTP packet behind an initial RTP packet;

E, a frame end bit, which occupies 1 bit and identifies the end of a multiple frame; wherein, if being set to 1, it identifies that the multiple frame is a RTP packet which ends with frame $I_{mi}$ or $P_{mi}$; if being set to 0, it identifies that the transmission of other multiple frames completes;

FT, a payload packet type bit, which occupies 2 bits and identifies the type of a payload packet; wherein, if T is 00 (video), i.e., the data frame to be transmitted is a video, 00 is set to identify frame I, 01 to identify frame P, 10 to identify frame B, and 11 as a reservation;

if T is 01 (audio), 01 is used for identification and the others for reservation;

if T is 10 (private frame), 11 is used for identification and others for reservation;

N, a payload packet sequence number bit, which occupies 4 bits and identifies the sequence number, ranging from 0 to 15, of a channel to which the transmitted payload packet (the encapsulated real-time transport protocol packet) belongs;

T1, which occupies 4 bits and identifies the number of a channel for a data frame to be transmitted.

In this embodiment, the payload packet type bit is a subtype bit of the data type bit.

In this embodiment, the data storage is performed by using the MPEG2PS/TS format commonly used in the security industry, an interconvertible mechanism between RTP and MPEG2PS/TS is provided, and the storage format of multi-channel audio and video data based on MPEG2PS/TS is defined. For the storage format of multi-channel audio and video data in the prior art, multi-channel audio and video data is encapsulated in MPEG2PS/TS, and different data type bit identificators (stream identifier) need to be selected for distinguishing. That is to say, according to the definition for PS/TS in ISO 138181, the data type bit identificators (ID) of video data may be selected from the field of 0xe0-0xef; the data type bit identificators of audio data may be selected from the field of 0xc0-0xcf. However, for the storage format of this embodiment, in the minimum unit PES of the MPEG2PS/TS, the information of each data stream (payload packet) is defined by an extension field, and one data type bit identificator is selected respectively for the audio and video data and private data for processing. In the case of using at most three data type bits (video 00, audio 01, private data 10), the encapsulation and storage of multi-channel audio and video data (stream) is implemented, which makes it simple to process and can effectively improve storage efficiency.

That is to say, in this embodiment, the data storage is performed by using the MPEG2PS/TS format commonly used in the security industry, the interconvertible mechanism between RTP and MPEG2PS/TS is provided, and the storage format of multi-channel audio and video data based on MPEG2PS/TS is defined. Wherein, based on the different qualities of the transmission medium, two types of composite information streams are defined in MPEG-2: one is TS (Transport Stream), the structure of whose packet is of a fixed length; the other one is PS (Program Stream), the structure of whose package is of a variable length. MPEG-2 is one of the video and audio lossy compression standards established by the MPEG (Moving Picture Experts Group) organization. The name of MPEG-2 may be "compression standard for moving pictures and audios based on digital storage media".

In this embodiment, the interaction between a service and a client may be performed based on a standard RTSP (Real Time Streaming Protocol), and data is transmitted by using an RTP packet. In the interaction based on a protocol, the attribute of the SDP (Session Description Protocol) of the RTSP protocol is extended. The extension defines a newly added attribute definition based on the RTSP protocol, which is used to inform the client of the number of a channel for audio and video and the encoding parameters of audio and video, etc. in actual code stream, through the extension field.

In this embodiment, the program code segment of the newly added attribute definition of the SDP may be as follows:

a=stream_mark: <stream mark tag>/<video count>/<audio count>/<private count> a=video_config:<stream0 configure>/<stream1 configure> • • • /<streamN configure> a=audio_config:<stream0 configure>/<stream1 configure> • • • /<streamN configure> a=priv_config:<stream0 configure>/<stream1 configure> • • • /<streamN configure>, stream_mark: multi-channel stream mark, video_config: video parameter configuration information, such as the width and height of a video, etc, audio_config: audio parameter configuration information, priv_config: private data configuration information.

For example, for a multi-channel stream, the corresponding program code segment of the newly added attribute definition of the SDP may be as follows:

a=stream_mark: MFI/video 2/audio 1/private 3
a=video_config: <stream0"abcdef">/<stream2 "0fffcd">
a=audio_config: <stream0"xxxxaa">
a=priv_config:<stream0"abmmac">/<stream2 "ddeff">/<stream2 "0fffcd">.

In this embodiment, the RTP packet received by the client is converted into PS data for storage. In subsequent applications, the stored PS data may be converted into the RTP packet for network transmission.

In an implementation, the process of converting an RTP packet into PS data may be: the client extracts the payload packet from the RTP packet, and performs PS encapsulation on the extracted payload packet to obtain PS data. Subsequently, the client may store the obtained PS data.

As can be seen from the above, in the method for transmitting data of the present application, data transmission mode is defined based on the standard RTSP protocol. In the case of complying with the standard protocol, the newly added attribute definition of an audio and a video and private data in SDP information of multi-channel data is designed, such that a data transmitter and a receiver may know the number and configuration information of media data streams, increasing the flexibility in processing multi-channel data. Further, by setting a frame start bit, a frame end bit, a data type bit and a payload packet type bit through the extension field, quickly framing is achieved and delay is effectively reduced. In addition, defining the storage format of data based on MPEG2PS/TS provides a way to store multi-channel streams using a small number of data type bit identificators, and does not limit the number of multi-channel streams, which is beneficial to synthesize a large amount of multi-channel stream data in the future.

Figure 9:
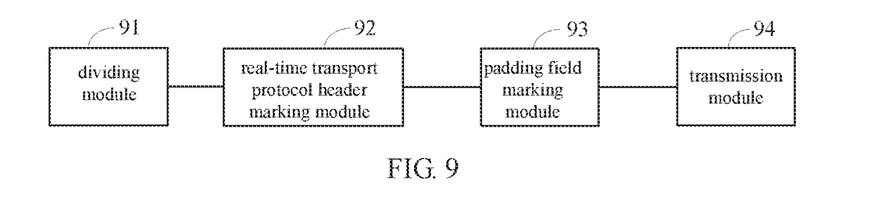
FIG. 9 is a schematic structural diagram of an apparatus for transmitting data of the second embodiment of the present application.

FIG. 9 is a schematic structural diagram of an apparatus for transmitting data of the second embodiment of the present application. As shown in FIG. 9, the apparatus in the present application may include a dividing module 91, a real-time transport protocol header marking module 92, a padding field marking module 93 and a transmission module 94.

The dividing module 91 is configured for dividing a data frame to be transmitted into one or more payload packets having a predetermined length;

In this embodiment, as an optional embodiment, the predetermined length is 4 bytes.

The real-time transport protocol header marking module 92 is configured for adding a real-time transport protocol header for each payload packet, and marking a padding bit in the real-time transport protocol header as padded.

In this embodiment, each of syntax formats of the RTP header is described as follows:

version (V), which occupies 2 bits and identifies a version;

padding (P), which occupies 1 bit; it identifies whether there is a padding part, and when being set to 1, represents that there is a padding part at the end of the RTP packet; the last byte of this padding part represents the length of this padding part (including the length of the last byte itself);

extension (X), which occupies 1 bit; it is an extension bit, identifies whether there is an extension field, and when being set to 1, represents that the RTP header of this RTP packet includes an extension field;

CSRC count (CC), which occupies 4 bits and identifies the number of Contributing Source (CSRC) fields;

marker (M), which occupies 1 bit, and when being set to 1, represents that the current RTP packet is the last packet transmitted;

payload type (PT), which occupies 7 bits and is configured for identifying the type of the transmitted data;

sequence number (SN), which occupies 16 bits and is configured for identifying the order in which RTP packets are sent, i.e., the order in which they are sent to a decoder by a receiving end after reception; wherein, for each RTP packet, the number is incremented by 1;

timestamp, which occupies 32 bits and is configured for identifying the acquisition (sampling) time of the content contained in this RTP packet;

other fields, such as, a synchronization source (SSRC) identifier, a CSRC identifier, etc., whose specific syntax formats are described in the related protocol and are omitted here.

The padding field marking module 93 is configured for, in a padding field corresponding to the padding bit, marking a data type bit, a frame start bit, a frame end bit and a payload packet type bit for the payload packet to obtain an encapsulated real-time transport protocol packet.

In this embodiment, as an optional embodiment, the padding field corresponding to the padding bit includes a data padding field and an extension field; wherein, the extension field occupies 4 bytes, and includes a reserved field, a multiple frame indicator field, and a padding size field. Wherein, in the multiple frame indicator field, the data type bit occupies 2 bits, each of the frame start bit and the frame end bit occupies 1 bit, and the payload packet type bit occupies 2 bits.

In this embodiment, as an optional embodiment, the multiple frame indicator field further includes a payload packet sequence number bit and a channel bit each of which occupies 4 bits.

In this embodiment, the multiple frame indicator field occupies 2 bytes, and the syntax format thereof is as follows:

V, which occupies 2 bits and identifies the type version number of MFI;

T, a data type bit, which occupies 2 bits and identifies the data type, wherein, 00 identifies a video, 01 identifies an audio, 10 identifies a private frame, and 11 is used as a reserved bit;

S, a frame start bit, which occupies 1 bit and identifies the start of the multiple frame (data frame); wherein, if being set to 1 (valid), it identifies that the multiple frame (data frame) is an initial RTP packet which starts from frame $I_{mi}$ or frame $P_{mi}$; if being set to 0 (invalid), it identifies that the multiple frame is a RTP packet behind an initial RTP packet;

E, a frame end bit, which occupies 1 bit and identifies the end of a multiple frame; wherein, if being set to 1, it identifies that the multiple frame is a RTP packet which ends with frame $I_{mi}$ or frame $P_{mi}$; if being set to 0, it identifies that the transmission of other multiple frames completes;

FT, a payload packet type bit, which occupies 2 bits and identifies the type of a payload packet; wherein, if T is 00 (video), i.e., the data frame to be transmitted is a video, 00 is set to identify frame I, 01 to identify frame P, 10 to identify frame B, and 11 as a reservation;

if T is 01 (audio), using 01 is used for identification and the others for reservation;

if T is 10 (private frame), 11 is used for identification and others for reservation;

N, a payload packet sequence number bit, which occupies 4 bits and identifies the sequence number, ranging from 0 to 15, of a channel to which the transmitted payload packet (the encapsulated real-time transport protocol packet) belongs;

T1, a channel bit, which occupies 4 bits and identifies the number of a channel for a data frame to be transmitted.

In this embodiment, as an optional embodiment, the padding field marking module 93 includes a padding field marking unit and an encapsulation unit (not shown in the figure); wherein, the padding field marking unit is configured for, if the payload packet is the first payload packet but not the last payload packet of the data frame, in the padding field corresponding to the padding bit, marking the frame start bit as valid, and marking the frame end bit as invalid;

if the payload packet is the first payload packet and the last payload packet of the data frame, in the padding field corresponding to the padding bit, marking the frame start bit as valid, and marking the frame end bit as valid;

if the payload packet is the last payload packet but not the first payload packet of the data frame, in the padding field corresponding to the padding bit, marking the frame start bit as invalid, and marking the frame end bit as valid;

if the payload packet is neither the first payload packet nor the last payload packet of the data frame, in the padding field corresponding to the padding bit, marking the frame start bit as invalid, and marking the frame end bit as invalid;

the encapsulation unit is configured for encapsulating the marked payload packet to obtain an encapsulated real-time transport protocol packet.

In this embodiment, as an optional embodiment, the padding field marking module 93 further includes:

a payload packet type bit marking unit, configured for, if the payload packet is a video frame I, in the padding field corresponding to the padding bit, marking the data type bit as 00, marking the payload packet type bit as 00, and marking a payload packet sequence number bit based on a sequence number of the payload packet during the dividing of the data frame;

if the payload packet is a video frame P, in the padding field corresponding to the padding bit, marking the data type bit as 00, marking the payload packet type bit as 01, and marking the payload packet sequence number bit based on a sequence number of the payload packet during the dividing of the data frame;

if the payload packet is a video frame B, in the padding field corresponding to the padding bit, marking the data type bit as 00, marking the payload packet type bit as 10, and marking the payload packet sequence number bit based on a sequence number of the payload packet during the dividing of the data frame;

if the payload packet is an audio, in the padding field corresponding to the padding bit, marking the data type bit as 01, marking the payload packet type bit as 01, and marking the payload packet sequence number bit based on a sequence number of the payload packet during the dividing of the data frame;

if the payload packet is private data, in the padding field corresponding to the padding bit, marking the data type bit as 10, marking the payload packet type bit as 11, and marking the payload packet sequence number bit based on a sequence number of the payload packet during the dividing of the data frame;

outputting the marked payload packet to the encapsulation unit.

The transmission module 94 is configured for transmitting the encapsulated real-time transport protocol packet.

In this embodiment, as an optional embodiment, the apparatus further includes a receiving module, an parsing module and a payload packet obtaining module (not shown in the figure); wherein, the receiving module is configured for receiving the encapsulated real-time transport protocol packet;

the parsing module is configured for parsing a real-time transport protocol header of the received encapsulated real-time transport protocol packet;

the payload packet obtaining module is configured for, if the padding bit in the real-time transport protocol header is marked as padded, reading each of the marked bits in the padding field corresponding to the padding bit, and obtaining a payload packet in the encapsulated real-time transport protocol packet through parsing based on the read marked bits.

In this embodiment, as an optional embodiment, obtaining a payload packet in the encapsulated real-time transport protocol packet through parsing based on the read marked bits, includes:

reading the marked data type bit in the padding field corresponding to the padding bit; if the data type bit mark is 01 or 10, reading the frame start bit and the frame end bit in the padding field corresponding to the padding bit; if the frame start bit is marked as valid and the frame end bit is marked as valid, determining that the transmitted data frame only includes a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame;

if the read data type bit in the padding field corresponding to the padding bit is marked as 00, reading the payload packet type bit in the padding field corresponding to the padding bit to determine that the payload packet behind the currently parsed real-time transport protocol header is a video frame I, a video frame P or a video frame B, and reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame.

In this embodiment, as an optional embodiment, reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame, includes:

if the frame start bit is marked as valid and the frame end bit is marked as valid, determining that the transmitted data frame only includes a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame.

In this embodiment, after the position of each of payload packets behind the currently parsed real-time transport protocol header in the transmitted data frame is determined, the framing may be performed based on the position of each of payload packets in the transmitted data frame to obtain the data frame.

In this embodiment, as another optional embodiment, the apparatus further includes a packetized elementary stream encapsulation module and a storage module (not shown in the figure); wherein, the packetized elementary stream encapsulation module is configured for adding a packetized elementary stream fixed header for the payload packet currently obtained through parsing, and marking a padding bit in the packetized elementary stream fixed header as padded; in the padding field corresponding to the padding bit, marking the data type bit, the frame start bit, the frame end bit and the payload packet type bit for the payload packet to obtain a packetized elementary stream packet;

the storage module is configured for storing the packetized elementary stream packet.

In this embodiment, the length of the padding field corresponding to the padding bit is no more than 7 bytes and no less than 4 bytes, and the padding field includes a padding byte and an extension field; wherein, the extension field is located between the packetized elementary stream fixed header and the padding byte.

The apparatus in this embodiment may be configured for implementing the technical solution of the embodiment of method shown in FIG. 1 to FIG. 8. The implementation principle and technical effects are similar, and will not be repeated herein.

It should be noted that the relationship terms used herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that is not specifically listed or the elements intrinsic to these processes, methods, articles, or devices. Without further limitations, elements defined by the wording "comprise(s) a/an • • • " do not exclude additional identical elements in the processes, methods, articles, or devices that includes the listed elements.

All of the embodiments in the description are described in a correlated manner, and identical or similar parts in various embodiments can refer to one another. In addition, the description for each embodiment focuses on the differences from other embodiments.

In particular, the embodiment of the apparatus is described briefly, since it is substantially similar to the embodiment of the method, and the related contents can refer to the description of the embodiment of the method.

The logic and/or steps represented in the flowchart or otherwise described herein, for example, which may be considered as an ordered list of executable instructions for implementing logical functions, may be embodied in any computer readable medium, for use by, or in conjunction with, instruction execution systems, apparatuses, or devices (for example, a computer-based system, a system including a processor, or other system that may extract instructions from an instruction execution system, apparatus, or device and execute the instructions). In terms of this specification, a "computer-readable medium" may be any apparatus that may include, store, communicate, propagate, or transmit a program for use by or in conjunction with the instruction execution systems, apparatuses, or devices. More specific examples (non-exhaustive list) of a computer readable medium include: an electrical connection (an electronic apparatus) having one or more wires, a portable computer disk cartridge (a magnetic apparatus), a random access memory (RAM), a read only memory (ROM), an erasable editable read only memory (EPROM or a flash memory), a fiber optic apparatus, and a portable compact disk read only memory (CDROM). In addition, the computer readable medium may even be papers or other suitable media on which the program may be printed, because the program can be obtained electronically, for example, by optical scanning papers or other media, followed by editing, interpreting or, if necessary, processing in other suitable manner, and then be stored in a computer memory.

It should be understood that each portion of the present application may be implemented in hardware, software, firmware, or a combination thereof.

In the above-described implementation, multiple steps or methods may be implemented in software or firmware stored in a memory and executed by a suitable instruction execution system. For example, if they are implemented in hardware, as in another embodiment, they may be implemented by any one or a combination of the following techniques well known in the art: a discretely logic circuit having logic gate circuits for implementing logic functions on data signals, an application specific integrated circuit having suitable combinational logic gate circuits, a programmable gate array (PGA), a field programmable gate array (FPGA), etc.

An embodiment of the present application further provides an electronic device, including an apparatus in any one of the embodiments described above.

Figure 10:
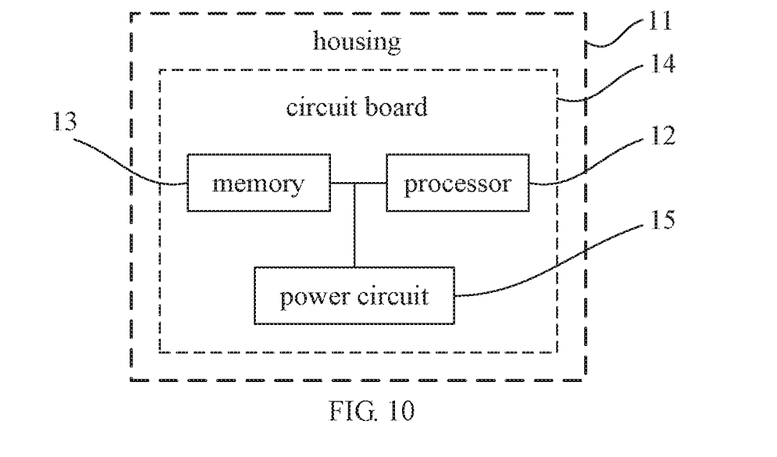
FIG. 10 is a schematic structural diagram of an embodiment of an electronic device of the present application.

FIG. 10 is a schematic structural diagram of an embodiment of an electronic device of the present application, which may implement the process of the embodiment shown in FIGS. 1-9 of the present application. As shown in FIG. 10, the electronic device may include a housing 11, a processor 12, a memory 13, a circuit board 14, and a power circuit 15. Wherein, the circuit board 14 is arranged inside a space surrounded by the housing 11; the processor 12 and the memory 13 are arranged on the circuit board 14; the power circuit 15 is configured for supplying power to each of circuits or components of said electronic device; the memory 13 is configured for storing an executable program code; the processor 12 is configured for implementing the method for transmitting data in any one of the embodiments described above by reading the executable program code stored in the memory 13 to execute a program corresponding to the executable program code.

For the specific process of the processor 12 executing the above-described steps and the steps further executed by the processor 12 by executing the executable program code, reference can be made to the description of the embodiment shown in FIGS. 1-9 of the present application, and it will not be repeated herein.

With the application of the embodiment of the present application, the processor of the electronic device executes, by reading an executable program code stored in the memory, a program corresponding to the executable program code. The program, when being executed, implements the method for transmitting data provided by the embodiment of the present application, which can thereby reduce network resource overhead and framing delay.

An embodiment of the present application provides an executable program code which, when being executed, implements the method for transmitting data provided by the embodiment of the present application. Wherein, the method for transmitting data may include steps of:

dividing a data frame to be transmitted into one or more payload packets having a predetermined length;

adding a real-time transport protocol header for each payload packet, and marking a padding bit in the real-time transport protocol header as padded;

in a padding field corresponding to the padding bit, marking a data type bit, a frame start bit, a frame end bit and a payload packet type bit for the payload packet to obtain an encapsulated real-time transport protocol packet; and transmitting the encapsulated real-time transport protocol packet.

With the application of the embodiment of the present application, the executable program code, when being executed, implements the method for transmitting data provided by the embodiment of the present application, which can thereby reduce network resource overhead and framing delay.

An embodiment of the present application provides a storage medium configured for storing an executable program code. The executable program code is executed to implement the method for transmitting data provided by the embodiment of the present application. Wherein, the method for transmitting data may include steps of:

dividing a data frame to be transmitted into one or more payload packets having a predetermined length;

adding a real-time transport protocol header for each payload packet, and marking a padding bit in the real-time transport protocol header as padded;

in a padding field corresponding to the padding bit, marking a data type bit, a frame start bit, a frame end bit and a payload packet type bit for the payload packet to obtain an encapsulated real-time transport protocol packet; and transmitting the encapsulated real-time transport protocol packet.

With the application of the embodiment of the present application, the storage medium stores an application program which, when being executed, implements the method for transmitting data provided by the embodiment of the present application, which can thereby reduce network resource overhead and framing delay.

The above-described electronic advice exists in various forms including but not limited to:

(1) mobile communication devices: this type of devices are characterized by having mobile communication functions, with primary purposes to provide voice and data communication. Such terminals include smart phones (e.g., iPhone), multimedia phones, functional phones, low-end phones, and the like.

(2) ultra-mobile personal computer devices: this type of devices belong to the category of personal computers, has computing and processing functions, and generally also has mobile network properties. This type of terminals include PDA, MID, UMPC (e.g., iPad) and the like.

(3) portable entertainment devices: this type of devices can display and play multimedia content. Such devices include audio and video players (e.g., iPod), Portable Game Consoles, ebooks, and smart toys and portable onboard navigation devices.

(4) servers: devices that provide computing services, and are composed of a processor, a hard disk, a RAM, a system bus and the like; the architecture of a server is similar to that of a general computer, but due to the need of providing highly reliable services, it has relatively high requirements in terms of processing capacity, stability, reliability, security, expandability, manageability and the like.

(5) other electronic devices that have a data interaction function.

It could be understood by those with ordinary skills in the art that all or a part of the steps of the embodiment of a method described above may be implemented by a program instructing related hardware, and the program may be stored in a computer-readable storage medium. The program, when is executed, implements one or a combination of the steps of the embodiment of a method.

For the convenience of description, the above apparatus is described respectively for individual units/modules divided in the form of functions. Of course, the functions of the individual units/modules may be implemented in one or more pieces of software and/or hardware when implementing the present application.

From the above description of the implementations, those skilled in the art may clearly understand that the present application may be implemented by means of software and the necessary universal hardware platform. Based on such understanding, the technical solution of the present application essentially or the portion thereof contributing to the prior art may be embodied in the form of a software product. The computer software product may be stored in a storage medium, such as a ROM/RAM, a magnetic disk, an optical disk, or the like, and includes several instructions that cause a computer device (which may be a personal computer, a server, or a network device, etc.) to implement the methods described in various embodiments or certain portions of the embodiments of the present application.

The above description is only specific implementation of the present application, and the protection scope of the present application is not limited thereto. Any alteration or substitution that can be easily conceived by those skilled in the art within the technical scope disclosed by the present application shall fall within the protection scope of the present application. Therefore, the protection scope of the present application shall be determined by that of the claims.

What is claimed is:

1. A method for transmitting data, comprising:
   dividing a data frame to be transmitted into one or more payload packets having a predetermined length;
   adding a real-time transport protocol header for each payload packet, and marking a padding bit in the real-time transport protocol header as padded;
   in a padding field corresponding to the padding bit, marking a data type bit, a frame start bit, a frame end bit and a payload packet type bit for the payload packet to obtain an encapsulated real-time transport protocol packet;
   transmitting the encapsulated real-time transport protocol packet;
   wherein, the padding field corresponding to the padding bit comprises a data padding field and an extension field; wherein, the extension field occupies 4 bytes, and comprises a reserved field, a multiple frame indicator field and a padding size field;
   wherein, in the multiple frame indicator field, the data type bit occupies 2 bits, each of the frame start bit and the frame end bit occupies 1 bit, and the payload packet type bit occupies 2 bits; and
   wherein, the multiple frame indicator field further comprises a payload packet sequence number bit and a channel bit each of which occupies 4 bits.

2. The method for transmitting data of claim 1, wherein, the obtaining of an encapsulated real-time transport protocol packet comprises:
   if the payload packet is the first payload packet but not the last payload packet of the data frame, in the padding field corresponding to the padding bit, marking the frame start bit as valid, and marking the frame end bit as invalid;
   if the payload packet is the first payload packet and the last payload packet of the data frame, in the padding field corresponding to the padding bit, marking the frame start bit as valid, and marking the frame end bit as valid;
   if the payload packet is the last payload packet but not the first payload packet of the data frame, in the padding field corresponding to the padding bit, marking the frame start bit as invalid, and marking the frame end bit as valid;
   if the payload packet is neither the first payload packet nor the last payload packet of the data frame, in the padding field corresponding to the padding bit, marking the frame start bit as invalid, and marking the frame end bit as invalid;
   encapsulating the marked payload packet to obtain an encapsulated real-time transport protocol packet.

3. The method for transmitting data of claim 2, wherein, before encapsulating the marked payload packet, the method further comprises:
   if the payload packet is a video frame I, in the padding field corresponding to the padding bit, marking the data type bit as 00, marking the payload packet type bit as 00, and marking a payload packet sequence number bit based on a sequence number of the payload packet during the dividing of the data frame;
   if the payload packet is a video frame P, in the padding field corresponding to the padding bit, marking the data type bit as 00, marking the payload packet type bit as 01, and marking the payload packet sequence number bit based on a sequence number of the payload packet during the dividing of the data frame;
   if the payload packet is a video frame B, in the padding field corresponding to the padding bit, marking the data type bit as 00, marking the payload packet type bit as 10, and marking the payload packet sequence number bit based on a sequence number of the payload packet during the dividing of the data frame;
   if the payload packet is an audio, in the padding field corresponding to the padding bit, marking the data type bit as 01, marking the payload packet type bit as 01, and marking the payload packet sequence number bit based on a sequence number of the payload packet during the dividing of the data frame;
   if the payload packet is private data, in the padding field corresponding to the padding bit, marking the data type bit as 10, marking the payload packet type bit as 11, and marking the payload packet sequence number bit based on a sequence number of the payload packet during the dividing of the data frame.

4. The method for transmitting data of claim 1, wherein, the method further comprises:
   receiving the encapsulated real-time transport protocol packet;
   parsing a real-time transport protocol header of the received encapsulated real-time transport protocol packet;
   if the padding bit in the real-time transport protocol header is marked as padded, reading each of the marked bits in the padding field corresponding to the padding bit, and obtaining a payload packet in the encapsulated real-time transport protocol packet through parsing based on the read marked bits.

5. The method for transmitting data of claim 4, wherein, obtaining a payload packet in the encapsulated real-time transport protocol packet through parsing based on the read marked bits, comprises:
   reading the marked data type bit in the padding field corresponding to the padding bit; if the data type bit is marked as 01 or 10, reading the frame start bit and the frame end bit in the padding field corresponding to the padding bit; if the frame start bit is marked as valid and the frame end bit is marked as valid, determining that the transmitted data frame only comprises a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame;

if the read data type bit in the padding field corresponding to the padding bit is marked as 00, reading the payload packet type bit in the padding field corresponding to the padding bit to determine that the payload packet behind the currently parsed real-time transport protocol header is a video frame I, a video frame P or a video frame B, and reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame.

6. The method for transmitting data of claim 4, wherein, the method further comprises:
adding a packetized elementary stream fixed header for the payload packet currently obtained through parsing, and marking a padding bit in the packetized elementary stream fixed header as padded; in the padding field corresponding to the padding bit, marking the data type bit, the frame start bit, the frame end bit and the payload packet type bit for the payload packet to obtain a packetized elementary stream packet;
storing the packetized elementary stream packet.

7. The method for transmitting data of claim 6, wherein, the length of the padding field corresponding to the padding bit is no more than 7 bytes and no less than 4 bytes, and the padding field comprises a padding byte and an extension field; wherein, the extension field is located between the packetized elementary stream fixed header and the padding byte.

8. A non-transitory storage medium storing instructions that are executed by a processor to implement a method for transmitting data comprising:
dividing a data frame to be transmitted into one or more payload packets having a predetermined length;
adding a real-time transport protocol header for each payload packet, and marking a padding bit in the real-time transport protocol header as padded;
in a padding field corresponding to the padding bit, marking a data type bit, a frame start bit, a frame end bit and a payload packet type bit for the payload packet to obtain an encapsulated real-time transport protocol packet;
transmitting the encapsulated real-time transport protocol packet;
wherein the padding field corresponding to the padding bit comprises a data padding field and an extension field; wherein, the extension field occupies 4 bytes, and comprises a reserved field, a multiple frame indicator field and a padding size field;

wherein, in the multiple frame indicator field, the data type bit occupies 2 bits, each of the frame start bit and the frame end bit occupies 1 bit, and the payload packet type bit occupies 2 bits; and wherein, the multiple frame indicator field further comprises a payload packet sequence number bit and a channel bit each of which occupies 4 bits.

9. The non-transitory storage medium of claim 8, wherein, the obtaining of an encapsulated real-time transport protocol packet comprises:
if the payload packet is the first payload packet but not the last payload packet of the data frame, in the padding field corresponding to the padding bit, marking the frame start bit as valid, and marking the frame end bit as invalid;
if the payload packet is the first payload packet and the last payload packet of the data frame, in the padding field corresponding to the padding bit, marking the frame start bit as valid, and marking the frame end bit as valid;
if the payload packet is the last payload packet but not the first payload packet of the data frame, in the padding field corresponding to the padding bit, marking the frame start bit as invalid, and marking the frame end bit as valid;
if the payload packet is neither the first payload packet nor the last payload packet of the data frame, in the padding field corresponding to the padding bit, marking the frame start bit as invalid, and marking the frame end bit as invalid;
encapsulating the marked payload packet to obtain an encapsulated real-time transport protocol packet.

10. The non-transitory storage medium of claim 9, wherein, before encapsulating the marked payload packet, the instructions are further executed to implement:
if the payload packet is a video frame I, in the padding field corresponding to the padding bit, marking the data type bit as 00, marking the payload packet type bit as 00, and marking a payload packet sequence number bit based on a sequence number of the payload packet during the dividing of the data frame;
if the payload packet is a video frame P, in the padding field corresponding to the padding bit, marking the data type bit as 00, marking the payload packet type bit as 01, and marking the payload packet sequence number bit based on a sequence number of the payload packet during the dividing of the data frame;
if the payload packet is a video frame B, in the padding field corresponding to the padding bit, marking the data type bit as 00, marking the payload packet type bit as 10, and marking the payload packet sequence number bit based on a sequence number of the payload packet during the dividing of the data frame;
if the payload packet is an audio, in the padding field corresponding to the padding bit, marking the data type bit as 01, marking the payload packet type bit as 01, and marking the payload packet sequence number bit based on a sequence number of the payload packet during the dividing of the data frame;
if the payload packet is private data, in the padding field corresponding to the padding bit, marking the data type bit as 10, marking the payload packet type bit as 11, and marking the payload packet sequence number bit based on a sequence number of the payload packet during the dividing of the data frame.

11. The non-transitory storage medium of claim 8, wherein, the instructions are further executed to implement:

receiving the encapsulated real-time transport protocol packet;

parsing a real-time transport protocol header of the received encapsulated real-time transport protocol packet;

if the padding bit in the real-time transport protocol header is marked as padded, reading each of the marked bits in the padding field corresponding to the padding bit, and obtaining a payload packet in the encapsulated real-time transport protocol packet through parsing based on the read marked bits.

12. The non-transitory storage medium of claim 11, wherein, obtaining a payload packet in the encapsulated real-time transport protocol packet through parsing based on the read marked bits, comprises:

reading the marked data type bit in the padding field corresponding to the padding bit; if the data type bit is marked as 01 or 10, reading the frame start bit and the frame end bit in the padding field corresponding to the padding bit; if the frame start bit is marked as valid and the frame end bit is marked as valid, determining that the transmitted data frame only comprises a payload packet behind the currently parsed real-time transport protocol header; if the frame start bit is marked as valid and the frame end bit is marked as invalid, determining that the payload packet behind the currently parsed real-time transport protocol header is the first payload packet in the transmitted data frame; if the frame start bit is marked as invalid and the frame end bit is marked as valid, determining that the payload packet behind the currently parsed real-time transport protocol header is the last payload packet in the transmitted data frame; if the frame start bit is marked as invalid and the frame end bit is marked as invalid, reading the payload packet sequence number bit in the padding field corresponding to the padding bit to determine a position of the payload packet behind the currently parsed real-time transport protocol header in the transmitted data frame;

if the read data type bit in the padding field corresponding to the padding bit is marked as 00, reading the payload packet type bit in the padding field corresponding to the padding bit to determine that the payload packet behind the currently parsed real-time transport protocol header is a video frame I, a video frame P or a video frame B, and reading the frame start bit and the frame end bit, or the frame start bit, the frame end bit and the payload packet sequence number bit in the padding field corresponding to the padding bit to determine the position of the payload packet behind the currently parsed real-time transport protocol header in the transmitted data frame.

13. The non-transitory storage medium of claim 11, wherein, the instructions are further executed to implement:

adding a packetized elementary stream fixed header for the payload packet currently obtained through parsing, and marking a padding bit in the packetized elementary stream fixed header as padded; in the padding field corresponding to the padding bit, marking the data type bit, the frame start bit, the frame end bit and the payload packet type bit for the payload packet to obtain a packetized elementary stream packet;

storing the packetized elementary stream packet.

14. The non-transitory storage medium of claim 13, wherein, the length of the padding field corresponding to the padding bit is no more than 7 bytes and no less than 4 bytes, and the padding field comprises a padding byte and an extension field; wherein, the extension field is located between the packetized elementary stream fixed header and the padding byte.

* * * * *